United States Patent
Kondo et al.

(10) Patent No.: US 7,300,982 B2
(45) Date of Patent: *Nov. 27, 2007

(54) PROCESS FOR PRODUCING MODIFIED POLYETHYLENE RESIN

(75) Inventors: Shinichi Kondo, Ichihara (JP); Takashi Sanada, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 352 days.

This patent is subject to a terminal disclaimer.

(21) Appl. No.: 10/800,672

(22) Filed: Mar. 16, 2004

(65) Prior Publication Data

US 2004/0198914 A1    Oct. 7, 2004

(30) Foreign Application Priority Data

Apr. 2, 2003    (JP) ............................. 2003-098929

(51) Int. Cl.
*C08F 267/04*    (2006.01)
*C08F 255/02*    (2006.01)

(52) U.S. Cl. ....................... 525/240; 525/263; 525/273; 525/285; 525/286; 525/301; 525/319; 526/230.5; 526/232.3; 526/232.5

(58) Field of Classification Search ................ 525/240, 525/263, 273, 285, 286, 301, 319; 526/230.5, 526/232.3, 232.5
See application file for complete search history.

(56) References Cited

U.S. PATENT DOCUMENTS

| | | | | |
|---|---|---|---|---|
| 4,616,059 A | * | 10/1986 | Motooka et al. ............ | 524/487 |
| 5,300,574 A | | 4/1994 | Bacskai | |
| 6,569,950 B2 | * | 5/2003 | Kitano et al. ............... | 525/285 |
| 2002/0161131 A1 | * | 10/2002 | Kitano et al. ............... | 525/263 |

FOREIGN PATENT DOCUMENTS

| | | |
|---|---|---|
| JP | 3-41105 B2 | 6/1991 |
| JP | 3-76327 B2 | 12/1991 |
| JP | 2002-256023 A | 9/2002 |

* cited by examiner

*Primary Examiner*—James J. Seidleck
*Assistant Examiner*—Olga Asinovsky
(74) *Attorney, Agent, or Firm*—Sughrue Mion, PLLC

(57) ABSTRACT

A process for producing a modified polyethylene resin, which comprises the step of melt kneading at least:
  (A) 100 parts by weight of a polyethylene resin,
  (B) from 0.1 to 20 parts by weight of at least one compound selected from the group consisting of:
    (B1) a compound having in its molecule (i) at least one carbon-carbon double or triple bond and (ii) at least one polar group, and
    (B2) a compound having in its molecule (iii) an OR group and (iv) at least two specific functional groups, and
  (C) from 0.01 to 20 parts by weight of an organic peroxide having a decomposition temperature of from 50 to 115° C., at which temperature a half-life thereof is 1 minute.

4 Claims, No Drawings

PROCESS FOR PRODUCING MODIFIED POLYETHYLENE RESIN

FIELD OF THE INVENTION

The present invention relates to a process for producing a modified polyethylene resin.

BACKGROUND OF THE INVENTION

Since a polyethylene resin does not have a polar group, said resin has problems that (1) said resin is unsatisfactory in its adhesive property with an inorganic material or a metal, coating property and printing property, and (2) a polymer alloy obtained by blending said resin with a polar group-containing polymer (particularly, what is called, an engineering plastic such as a polyester resin, a polyamide resin, a polyphenylene sulfide resin and a polyphenylene oxide resin) is unsatisfactory in its mechanical strength such as impact resistance, and as a result, a molded article comprising the polymer alloy peels easily in its surface.

In order to solve these problems, there is generally known a method of graft-modifying the polyethylene resin, wherein the polyethylene resin, a polar group-containing compound and a radical-generating compound such as an organic peroxide are melt kneaded in a kneading extruder in order to graft the polar group-containing compound onto the polyethylene resin (JP 3-41105B and JP 3-76327B).

SUMMARY OF THE INVENTION

However, said method has a limit to raising a graft amount, because addition of a large amount of a radical-generating compound in order to raise a graft amount results in remarkable lowering of a melt index of a melt-kneaded product due to crosslinking of the polyethylene resin.

An object of the present invention is to provide a process for producing a modified polyethylene resin, which has only a small degree of the above-mentioned lowering of a melt index, and is superior in its productivity.

The present inventors have undertaken extensive studies to accomplish the above-mentioned object, and as a result, have found that the above-mentioned object can be accomplished using a specific organic peroxide, and thereby the Present invention has been obtained.

The present invention is a process for producing a modified polyethylene resin, which comprises the step of melt kneading at least:

(A) 100 parts by weight of a polyethylene resin, (B) from 0.1 to 20 parts by weight of at least one compound selected from the group consisting of:

(B1) a compound having in its molecule (i) at least one carbon-carbon double or triple bond and (ii) at least one polar group, and (B2) a compound having in its molecule (iii) an OR group and (iv) at least two functional groups, which functional groups are the same as or different from each other, and are selected from the group consisting of a carboxylic acid group, an acid halide group, an acid anhydride group, an acid halide anhydride group, an acid ester group, an acid amide group, an imide group, an imido group, an amino group and a salt of an amino group, wherein the R is hydrogen, an alkyl group, an aryl group, an acyl group or a carbonyldioxy group, and (C) from 0.01 to 20 parts by weight of an organic peroxide having a decomposition temperature of from 50 to 115° C., at which temperature a half-life thereof is 1 minute.

DETAILED DESCRIPTION OF THE INVENTION

The polyethylene resin (A) used in the present invention means:

(1) a homopolymer resin of ethylene, (2) an ethylene-α-olefin copolymer resin comprising an ethylene unit of from 60 to 99.99% by weight and an α-olefin unit of from 40 to 0.01% by weight, (3) an ethylene-acrylic ester copolymer resin comprising an ethylene unit of from 60 to 99.99% by weight and an acrylic ester unit of from 40 to 0.01% by weight, (4) an ethylene-methacrylic ester copolymer resin comprising an ethylene unit of from 60 to 99.99% by weight and a methacrylic ester unit of from 40 to 0.01% by weight, or (5) an ethylene-vinyl acetate copolymer resin comprising an ethylene unit of from 60 to 99.99% by weight and a vinyl acetate unit of from 40 to 0.01% by weight, wherein the total of the both units is 100% by weight, respectively. Here, the term "unit" means a polymerized monomer unit contained in the ethylene-α-olefin copolymer resin.

Examples of the α-olefin are propylene, 1-butene, 1-pentene, 1-hexene, 1-octene, 1-decene, 1-dodecene and 1-eicosene.

Examples of the ethylene-α-olefin copolymer resin are an ethylene-propylene copolymer resin, an ethylene-1-butene copolymer resin, an ethylene-1-pentene copolymer resin, an ethylene-1-hexene copolymer resin, an ethylene-1-octene copolymer resin, an ethylene-1-decene copolymer resin, an ethylene-1-dodecene copolymer resin, and an ethylene-1-eicosene copolymer resin. Among them, preferred is an ethylene-propylene copolymer resin, an ethylene-1-butene copolymer resin, an ethylene-1-hexene copolymer resin, or an ethylene-1-octene copolymer resin.

Examples of the ethylene-acrylic ester copolymer resin are an ethylene-methyl acrylate copolymer resin, an ethylene-ethyl acrylate copolymer resin, an ethylene-butyl acrylate copolymer resin, an ethylene-hexyl acrylate copolymer resin, an ethylene-lauryl acrylate copolymer resin, and an ethylene-stearyl acrylate copolymer resin. Among them, preferred is an ethylene-methyl acrylate copolymer resin, or an ethylene-ethyl acrylate copolymer resin.

Examples of the ethylene-methacrylic ester copolymer resin are an ethylene-methyl methacrylate copolymer resin, an ethylene-ethyl methacrylate copolymer resin, an ethylene-butyl methacrylate copolymer resin, an ethylene-hexyl methacrylate copolymer resin, an ethylene-lauryl methacrylate copolymer resin, and an ethylene-stearyl methacrylate copolymer resin. Among them, preferred is an ethylene-methyl methacrylate copolymer resin, or an ethylene-ethyl methacrylate copolymer resin.

An example of the polar group contained in the compound (B1) is a functional group, which has affinity or chemical reactivity to an internal amide linkage, a terminal carboxyl group or a terminal amino group contained in a polyamide resin.

Examples of said functional group are a carboxylic acid group, an ester group of a carboxylic acid, an amide group thereof, an anhydride group thereof, an imide group thereof, an azide group thereof, a halide group thereof, an oxazoline group, a nitrile group, an epoxy group, an amino group, a hydroxyl group and an isocyanic acid ester group.

Examples of the compound (B1) are an unsaturated carboxylic acid and its derivatives, an unsaturated epoxy compound, an unsaturated alcohol, an unsaturated amine and an unsaturated isocyanic acid ester.

Specific examples of the compound (B1) are maleic acid, maleic anhydride, fumaric acid, maleimide, maleic acid hydrazide, a reaction product of maleic anhydride with a diamine, which product is represented by the following formula, wherein R is an aliphatic group or an aromatic group,

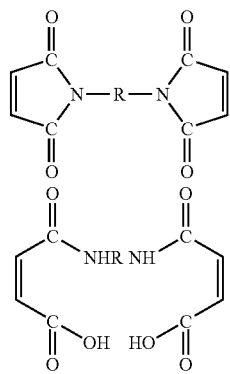

methylnadic acid anhydride, dichloromaleic acid anhydride, maleic acid amide, itaconic acid, itaconic acid anhydride, natural oils and fats (for example, soybean oil, tung oil, castor oil, linseed oil, falx oil, cotton oil, sesame oil, rapeseed oil, peanut oil, camellia oil, olive oil, coconut oil and sardine oil), epoxidized natural oils and fats, an unsaturated carboxylic acid (for example, acrylic acid, butenoic acid, crotonic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexene, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-hexadienoic acid, dially acetate, geranic acid, 2,4-decadienoic acid, 2,4-dodecadienoic acid, 9,12-hexadecadienoic acid, 9,12-octadecadienoic acid, hexadecatrienoic acid, eicosadienoic acid, eicosatrienoic acid, eicosatetraenoic acid, ricinoleic acid, eleostearic acid, oleic acid, eicosapentaenoic acid, erucic acid, docosadienoic acid, docosatrienoic acid, docosatetraenoic acid, docosapentaenoic acid, tetracosenoic acid, hexacosenoic acid, hexacodienoic acid and octacosenoic acid), unsaturated carboxylic acid esters, unsaturated carboxylic acid amides, unsaturated carboxylic acid anhydrides, unsaturated alcohols (for example, allyl alcohol, crotyl alcohol, methylvinyl carbinol, ally carbinol, methylpropenyl carbinol, 4-penten-1-ol, 10-undecen-1-ol, propargyl alcohol, 1,4-pentadien-3-ol, 1,4-hexadien-3-ol, 3,5-hexadien-2-ol, 2,4-hexadien-1-ol, alcohols represented by the formulas $C_nH_{2n-5}OH$, $C_nH_{2n-7}OH$ and $C_nH_{2n-9}OH$ (n is a positive integer), 3-buten-1,2-diol, 2,5-dimethyl-3-hexen-2,5-diol, 1,5-hexadien-3,4-diol and 2,6-octadien-4,5-diol), unsaturated amines obtained by replacing an OH group in unsaturated alcohols with an —$NH_2$ group, glycidyl (meth) acrylate, ally glycidyl ether, products obtained by (1) adding maleic anhydride or phenols to low molecular weight polymers of butadiene or isoprene (for example, those having an average molecular weight of from 500 to 10000) or high molecular weight polymers thereof (for example, those having an average molecular weight of not less than 10000), or (2) introducing an amino group, a carboxyl group, a hydroxyl group or an epoxy group thereto, and ally isocyanate.

Among them, preferred is maleic anhydride, maleic acid, fumaric acid, itaconic anhydride, itaconic acid, glycidyl (meth)acrylate or 2-hydroxyethylmethacrylate.

The above-mentioned compounds may be used in combination of two or more thereof.

The OR group contained in the compound (B2) contains preferably from 1 to 20 carbon atoms.

Examples of the alkyl group of R in the compound (B2) are a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nanodecyl group and an eicosyl group. Examples of the aryl group of R therein are a phenyl group, a tolyl group, a xylyl group, a biphenyl group, a naphthyl group, an anthryl group and a phenanthryl group. Examples of the acyl group of R therein are a formyl group, an acetyl group, a propionyl group, a butyryl group, a valeryl grup, a palmitoyl group, a stearoyl group, an oleoyl group, an oxalyl group, a malonyl group, a succinyl group, a benzoyl group, a toluoyl group, a salicyloyl group, a cinnamoyl group, a naphthoyl group, a phthaloyl group and a furoyl group.

Examples of the compound (B2) are an aliphatic polycarboxylic acid, its ester and its amide.

More specific examples of the compound (B2) are a saturated aliphatic polycarboxylic acid represented by the formula $(R_1)R'(COOR_2)(CONR_3R_4)_L$ (in the formula, R' is a linear or branched saturated aliphatic hydrocarbon group having from 2 to 20 carbon atoms, and preferably from 2 to 10 carbon atoms; $R_1$ is hydrogen, an alkyl group, an aryl group, an acyl group or a carbonyldioxy group, and preferably hydrogen; $R_2$ is hydrogen, an alkyl group or an aryl group having from 1 to 20 carbon atoms, and preferably from 1 to 10 carbon atoms; $R_3$ and $R_4$ is hydrogen, an alkyl group or an aryl group having from 1 to 10 carbon atoms, preferably from 1 to 6 carbon atoms, and further preferably from 1 to 4 carbon atoms; n+L is an integer of not less than 2, and preferably 2 or 3; n is an integer of not less than 0; L is an integer of not less than 0; $R_1O$ is positioned at an α-position or a β-position for the carbonyl group; and from 2 to 6 carbon atoms exist between at least two carbonyl groups), and its derivatives.

Further specific examples of the compound (B2) are an ester compound of a saturated aliphatic polycarboxylic acid, an amide compound thereof, an anhydride thereof, a hydrate thereof and a salt thereof. Examples of the saturated aliphatic polycarboxylic acid are citric acid, malic acid and agaricic acid. These compounds are disclosed in detail in JP-W-61-502195.

The compound (B2) is added in an amount of from 0.1 to 20 parts by weight, and preferably from 0.5 to 10 parts by weight per 100 parts by weight of the polyethylene resin (A). When said amount is less than 0.1 part by weight, a graft amount to the polyethylene resin is low, and as a result, enough adhesive strength cannot be obtained. When said amount is more than 20 parts by weight, the obtained modified polyethylene resin contains much of the compound (B2) remaining unreacted, and as a result, enough adhesive strength cannot be obtained.

The organic peroxide (C) used in the present invention has a decomposition temperature of from 50 to 115° C., and preferably from 70 to 110° C., at which temperature a half-life thereof is 1 minute. When said decomposition temperature is lower than 50° C., a graft amount is low, and when said decomposition temperature is higher than 115° C., a melt index of the obtained modified polyethylene resin is remarkably low. The organic peroxide (C) preferably has a function of decomposing to generate a radical, which pulls a proton from the polyethylene resin (A) by a pull reaction.

Examples of the organic peroxide (C) are diacyl peroxide compounds; percarbonate compounds having the following structure (1) in its molecule; and alkyl perester compounds having the following structure (2) in its molecule. Among them, percarbonate compounds are preferable in view of the above-mentioned proton-pulling function.

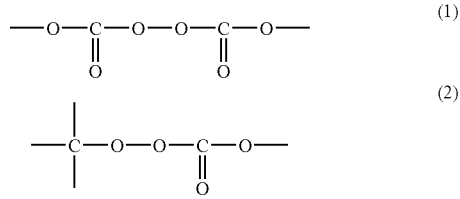

Examples of the above-mentioned percarbonate compounds are dicetyl peroxydicarbonate, di-3-methoxybutyl peroxydicarbonate, di-2-ethylhexyl peroxydicarbonate, bis(4-t-butylcyclohexyl) peroxydicarbonate, diisopropyl peroxydicarbonate, t-butyl peroxyisopropylcarbonate and dimyristyl peroxycarbonate, Examples of the above-mentioned alkyl perester compounds are 1,1,3,3-tetramethylbutyl neodecanoate, α-cumyl peroxyneodecanoate and t-butyl peroxyneodecanoate.

The organic peroxide (C) is added in an amount of from 0.01 to 20 parts by weight, and preferably from 0.05 to 10 parts by weight per 100 parts by weight of the polyethylene resin (A). When said amount is less than 0.01 part by weight, a graft amount to the polyethylene resin is low. When said amount is more than 20 parts by weight, crosslinking of the polyethylene resin is promoted.

Each of the above-mentioned components (A), (B) ((B1) and (B2)) and (C) used in the present invention can be combined with another organic peroxide than the organic peroxide (C). An example thereof is a dialkylperoxide compound.

Further, each of the components (A), (B) and (C) used in the present invention can be combined with an electron donor compound such as styrene and divinylbenzene, or additives such as antioxidants, heat stabilizers and neutralizers, which additives are generally used in combination with a polyolefin resin.

In the present invention, a method for obtaining a blend or a method of melt kneading may be a method known in the art. A preferable method comprises the steps of (1) blending the total amount of the above-mentioned components (A), (B) and (C) in a lump in a blending apparatus such as a Henschel mixer, a ribbon blender and a blender to obtain a homogeneous blend, or blending separately some combinations containing the above-mentioned components in a blending apparatus mentioned above to obtain some homogeneous blends, and then (2) melt kneading the obtained blend(s) in a kneading apparatus.

Examples of the kneading apparatus are those known in the art such as a Banbury mixer, a plastomil, a Brabender plastograph, a single-screw extruder and a twin-screw extruder. The single-screw or twin-screw extruder is particularly preferable in view of continuous production (namely, productivity).

Temperature in a melt kneading zone of the kneading apparatus is generally from 50 to 300° C., and preferably from 100 to 250° C. When said temperature is lower than 50° C., a graft amount may be low, and when it is higher than 300° C., the polyethylene resin (A) may decompose. A preferable extruder has a first-half melt kneading zone and a latter-half melt kneading zone, wherein temperature in the latter-half melt kneading zone is higher than that in the first-half melt kneading zone. A melt kneading period of time is from 0.1 to 30 minutes, and particularly preferably from 0.5 to 5 minutes. When said period of time is shorter than 0.1 minute, a graft amount may be insufficient, and when it is longer than 30 minutes, the polyethylene resin (A) may decompose.

EXAMPLE

The present invention is explained with reference to the following Example, which does not limit the scope of the present invention.

Example 1

To 100 parts by weight of a linear low density ethylene polymer (trade name of SUMIKATHENE-L GA804) manufactured by Sumitomo Chemical Company, Limited, which has a melt index of 50 g/10 min. measured according to JIS K7210 at 190° C. under a load of 21.2 N, 2.0 parts by weight of maleic anhydride and 0.50 part by weight of dicetyl peroxydicarbonate were added, and these components were mixed sufficiently, thereby obtaining a mixture. The mixture was fed to an extruder, and melt kneaded, thereby obtaining a modified polyethylene resin.

As the above-mentioned extruder, there was used a twin-screw extruder (L/D=41, and a cylinder diameter=53 mm), TEM-50A, manufactured by Toshiba Machine Co., Ltd., wherein a screw rotating speed was 250 rpm, temperature in its first-half melt kneading zone was 180° C., and temperature in its latter-half melt kneading zone was 260° C.

The obtained modified polyethylene resin was evaluated, and results thereof are shown in Table 1, wherein the graft amount of maleic acid contained in the obtained modified polyethylene resin was measured according to a method comprising the steps of:

(1) dissolving 1.0 gram of the modified polyethylene resin in 10 ml of xylene to obtain a solution, (2) dropping the solution into 300 ml of methanol under stirring to re-precipitate the resin, (3) separating the re-precipitated resin by filtration, (4) drying the separated resin in a vacuum drier at 80° C. for 8 hours, (5) hot-pressing the dried resin to obtain a film having 100 μm-thickness, (6) measuring an infrared absorption spectrum of the film, and (7) determining the amount of grafted maleic acid (% by weight) from the absorption near 1780 cm$^{-1}$, wherein the total amount of the resin was 100% by weight.

Comparative Example 1

Example 1 was repeated except that 0.50 part by weight of dicetyl peroxydicarbonate was changed to 0.15 part by weight of 1,3-bis(t-butylperoxyisopropyl)benzene. Results are shown in Table 1.

TABLE 1

|  | Example 1 | Comparative Example 1 |
|---|---|---|
| Blending (part by weight) | | |
| (A) Polyethylene resin | 100 | 100 |
| (B) Maleic anhydride | 2.0 | 2.0 |
| (C) Organic peroxide | 0.50 (Note 1) | 0.15 (Note 2) |
| Evaluation result | | |
| Melt index (g/10 min.) | 7.2 | 3.5 |
| Content of grafted maleic anhydride (% by weight) | 0.9 | 1.1 |

Note 1
There was used dicetyl peroxydicarbonate (active oxygen content = 2.8%) having a decomposition temperature of 99° C., at which temperature a half-life thereof is 1 minute.
Note 2
There was used 1,3-bis(t-butylperoxyisopropyl)benzene (active oxygen content = 9.3%) having a decomposition temperature of 183° C., at which temperature a half-life thereof is 1 minute.

The invention claimed is:

1. A process for producing a modified polyethylene resin, which comprises the step of melt kneading at least:
   (A) 100 parts by weight of a polyethylene resin,
   (B) from 0.1 to 20 parts by weight of at least one compound selected from the group consisting of:
      (B1) a compound having in its molecule (i) at least one carbon-carbon double or triple bond and (ii) at least one polar group, and
      (B2) a compound having in its molecule (iii) an OR group and (iv) at least two functional groups, which functional groups are the same as or different from each other, and are selected from the group consisting of a carboxylic acid group, an acid halide group, an acid anhydride group, an acid halide anhydride group, an acid ester group, an acid amide group, an imide group, an imido group, an amino group and a salt of an amino group, wherein the R is hydrogen, an alkyl group, an aryl group, an acyl group or a carbonyldioxy group, and
   (C) from 0.01 to 20 parts by weight of an organic peroxide having a decomposition temperature of from 50 to 115° C., at which temperature a half-life thereof is 1 minute,
   wherein the melt kneading is carried out in an extruder having a first-half melt kneading zone and a latter-half melt kneading zone, and a temperature in the latter-half melt kneading zone is higher than that in the first-half melt kneading zone.

2. The process for producing a modified polyethylene resin according to claim 1, wherein the organic peroxide (C) has the following structure (1),

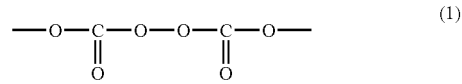

in its molecule.

3. The process for producing a modified polyethylene resin according to claim 1, wherein the organic peroxide (C) is dicetyl peroxydicarbonate.

4. The process for producing a modified polyethylene resin according to claim 1, wherein the compound (B1) is maleic anhydride, maleic acid, fumaric acid, itaconic anhydride, itaconic acid, glycidyl (meth)acrylate or 2-hydroxyethylmethacrylate.

* * * * *